United States Patent
Li et al.

(10) Patent No.: US 10,945,143 B2
(45) Date of Patent: Mar. 9, 2021

(54) DATA TRANSMISSION METHOD, APPARATUS, AND SYSTEM

(71) Applicant: HUAWEI TECHNOLOGIES CO., LTD., Guangdong (CN)

(72) Inventors: Jing Li, Shenzhen (CN); Yang Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/188,824

(22) Filed: Nov. 13, 2018

(65) Prior Publication Data

US 2019/0082341 A1    Mar. 14, 2019

Related U.S. Application Data

(63) Continuation of application No. PCT/CN2017/082041, filed on Apr. 26, 2017.

(30) Foreign Application Priority Data

May 12, 2016 (CN) .......................... 201610312314.4

(51) Int. Cl.
*H04W 24/08* (2009.01)
*H04L 29/06* (2006.01)
(Continued)

(52) U.S. Cl.
CPC ............. *H04W 24/08* (2013.01); *H04L 29/06* (2013.01); *H04W 4/70* (2018.02); *H04W 60/00* (2013.01); *H04W 88/023* (2013.01); *H04W 88/16* (2013.01)

(58) Field of Classification Search
None
See application file for complete search history.

(56) References Cited

U.S. PATENT DOCUMENTS 6,124,806 A * 9/2000 Cunningham ......... G08C 17/02
                                                    340/870.02
2003/0023756 A1   1/2003 Awamoto et al.
(Continued)

FOREIGN PATENT DOCUMENTS

CN    1753390 A    3/2006
CN    102131297 A    7/2011
(Continued)

OTHER PUBLICATIONS

Office Action issued in Japanese Application No. 2018-559735 dated Oct. 15, 2019, 12 pages (with English translation).
(Continued)

*Primary Examiner* — Andrea Tacdiran
(74) *Attorney, Agent, or Firm* — Fish & Richardson P.C.

(57) ABSTRACT

Embodiments of the present invention provide a data transmission method, apparatus, and system. The method is applied to a data transmission system. The data transmission system includes a system platform and a terminal device. A method performed by the system platform includes: determining, based on a type of the terminal device and a type of data generated by the terminal device, a data transmission rule of the data generated by the terminal device; and sending a data transmission message to the terminal device, where the data transmission message carries the data transmission rule, so that the terminal device sends, to the system platform based on the data transmission rule, the data corresponding to the data transmission rule. Massive data can be effectively prevented from being transmitted to the system platform by configuring the data transmission rule, and data with a high priority can be preferentially processed, to improve system performance.

13 Claims, 4 Drawing Sheets

(51) Int. Cl.
*H04W 4/70* (2018.01)
*H04W 60/00* (2009.01)
*H04W 88/02* (2009.01)
*H04W 88/16* (2009.01)

(56) References Cited

U.S. PATENT DOCUMENTS

| | | | | |
|---|---|---|---|---|
| 2005/0275528 | A1* | 12/2005 | Kates | G08B 17/00 340/539.22 |
| 2006/0133342 | A1* | 6/2006 | Zeng | H04W 74/06 370/346 |
| 2006/0282498 | A1 | 12/2006 | Muro | |
| 2011/0010547 | A1* | 1/2011 | Noda | G06F 21/445 713/168 |
| 2011/0317636 | A1* | 12/2011 | Diachina | H04W 74/0833 370/329 |
| 2012/0119902 | A1* | 5/2012 | Patro | H04W 52/0238 340/502 |
| 2013/0028184 | A1 | 1/2013 | Lee et al. | |
| 2013/0176902 | A1 | 7/2013 | Wentink et al. | |
| 2014/0198798 | A1 | 7/2014 | Akiyoshi et al. | |
| 2014/0241161 | A1* | 8/2014 | Tornkvist | H04W 28/18 370/235 |
| 2014/0269513 | A1* | 9/2014 | Yu | H04L 67/303 370/328 |
| 2015/0141030 | A1 | 5/2015 | Basu-Mallick et al. | |
| 2015/0242412 | A1* | 8/2015 | Mathur | G06F 3/0649 707/665 |
| 2015/0244632 | A1* | 8/2015 | Katar | H04L 12/2838 370/230 |
| 2015/0373481 | A1 | 12/2015 | Eom et al. | |
| 2016/0036918 | A1* | 2/2016 | Lee | H04L 47/24 370/230 |
| 2016/0092288 | A1* | 3/2016 | Rawat | H04L 67/1034 714/57 |
| 2016/0124976 | A1* | 5/2016 | Bai | G08G 1/096741 707/748 |
| 2016/0278109 | A1 | 9/2016 | Yamada et al. | |
| 2017/0019483 | A1 | 1/2017 | Maturana et al. | |
| 2017/0148285 | A1* | 5/2017 | Spiro | H04L 67/125 |
| 2018/0063561 | A1* | 3/2018 | Kwon | H04N 21/462 |
| 2018/0097661 | A1* | 4/2018 | Verma | H04M 11/066 |
| 2018/0109987 | A1* | 4/2018 | Xu | H04W 36/385 |
| 2018/0152518 | A1* | 5/2018 | Lee | H04L 67/322 |

FOREIGN PATENT DOCUMENTS

| | | |
|---|---|---|
| CN | 103685442 A | 3/2014 |
| CN | 103947284 A | 7/2014 |
| EP | 0895374 B1 | 1/2007 |
| EP | 2093931 A1 | 8/2009 |
| JP | 2004120592 A | 4/2004 |
| JP | 2006344017 A | 12/2006 |
| JP | 2007172048 A | 7/2007 |
| JP | 2009218776 A | 9/2009 |
| JP | 2013516887 A | 5/2013 |
| JP | 2015506635 A | 3/2015 |
| JP | 2015097308 A | 5/2015 |
| JP | 2015525041 A | 8/2015 |
| JP | 2016066323 A | 4/2016 |
| KR | 20150145593 A | 12/2015 |

OTHER PUBLICATIONS

Extended European Search Report, dated Dec. 6, 2018, in European Application No. 17795434.4 (7 pp.).

International Search Report dated Jul. 31, 2017 in corresponding International Application No. PCT/CN2017/082041.

Office Action issued in Chinese Application No. 201610312314.4 dated Dec. 3, 2019, 13 pages (With English Translation).

Office Action issued in Japanese Application No. 2018-559735 dated Apr. 13, 2020, 9 pages (with English translation).

Office Action issued in Korean Application No. 2018-7036049 dated Oct. 29, 2020, 7 pages (with English translation).

* cited by examiner

DATA TRANSMISSION METHOD, APPARATUS, AND SYSTEM

CROSS-REFERENCE TO RELATED APPLICATIONS

This application is a continuation of International Application No. PCT/CN2017/082041, filed on Apr. 26, 2017, which claims priority to Chinese Patent Application No. 201610312314.4, filed on May 12, 2016, The disclosures of the aforementioned applications are hereby incorporated by reference in their entireties.

TECHNICAL FIELD

Embodiments of the present invention relate to the field of mobile communications technologies, and in particular, to a data transmission method, apparatus, and system.

BACKGROUND

The Internet of Things (IOT for short) is a huge network obtained by combining the Internet with various information sensing devices such as a radio frequency identification apparatus, an infrared sensor, a global positioning system, and a laser scanner. A purpose is to connect all objects to the network to facilitate identification and management. Due to this feature of the Internet of Things, the IOT network has massive data to be transmitted at a same time. The massive data transmission degrades system performance. How to resolve the massive data transmission to improve the system performance is a technical problem to be resolved in the present invention.

SUMMARY

Embodiments of the present invention provide a data transmission method, apparatus, and system.

According to a first aspect, the present invention provides a data transmission method, where the method is applied to a data transmission system, the data transmission system includes a system platform and a terminal device, and a method performed by the system platform includes:
  determining, based on a type of the terminal device and a type of data generated by the terminal device, a data transmission rule of the data generated by the terminal device; and
  sending a data transmission message to the terminal device, where the data transmission message carries the data transmission rule, so that the terminal device sends, to the system platform based on the data transmission rule, the data corresponding to the data transmission rule.

With reference to the first aspect, in a first possible implementation of the first aspect, the determining, based on a type of the terminal device and a type of data generated by the terminal device, a data transmission rule of the data generated by the terminal device specifically includes:
  determining, based on the type of the terminal device and the type of the data of the terminal device, a priority of the data generated by the terminal device; and
  determining the data transmission rule based on the priority of the data.

With reference to the first aspect or the first possible implementation of the first aspect, in a second possible implementation of the first aspect, the data transmission rule includes a data transmission priority and a data transmission manner.

With reference to the second possible implementation of the first aspect, in a third possible implementation of the first aspect, when the priority of the data is less than a first predetermined threshold, the data transmission manner specifically includes: setting the terminal device to upload the data to the system platform only when the system platform queries the data.

With reference to the third possible implementation of the first aspect or the fourth possible implementation of the first aspect, in a fifth possible implementation of the first aspect, the data transmission rule further includes an advance data reporting rule, where the advance data reporting rule is used for transmitting the data to the system platform once the terminal device detects that a floating change value of the data is greater than a second predetermined threshold.

With reference to any one of the first aspect to the fourth possible implementation of the first aspect, in a fifth possible implementation of the first aspect, the method further includes:
  adding a header field to the data transmission message, where the header field includes an indication information element, and the indication information element is used to indicate the priority of the data.

According to a second aspect, the present invention provides another data transmission method, where the method is applied to a data transmission system, the data transmission system includes a system platform, a gateway, and a terminal device, and a method performed by the system platform includes:
  determining, based on a type of the terminal device and a type of data generated by the terminal device, a data transmission rule of data transmitted by the gateway; and
  sending a data transmission message to the gateway, where the data transmission message carries a data transmission rule, so that the gateway obtains, from the terminal device based on the data transmission rule, data corresponding to the data transmission rule, and sends the data to the system platform.

With reference to the second aspect, in a first possible implementation of the second aspect, the determining, based on a type of the terminal device and a type of data generated by the terminal device, a data transmission rule of data transmitted by the gateway specifically includes:
  determining, based on the type of the terminal device and the type of the data of the terminal device, a priority of the data generated by the terminal device; and
  determining the data transmission rule based on the priority of the data.

With reference to the second aspect or the first possible implementation of the second aspect, in a second possible implementation of the second aspect, the data transmission rule includes a data transmission priority and a data transmission manner.

With reference to the second possible implementation of the second aspect, in a third possible implementation of the second aspect, when the priority of the data is less than a first predetermined threshold, the data transmission manner specifically includes: setting the gateway to upload the data to the system platform only when the system platform queries the data.

With reference to the second possible implementation of the second aspect or the third possible implementation of the second aspect, in a fourth possible implementation of the second aspect, the data transmission rule further includes an advance data reporting rule, where the advance data reporting rule is used for transmitting the data to the system platform once the gateway detects that a floating change value of the data is greater than a second predetermined threshold.

With reference to any one of the second aspect to the fourth possible implementation of the second aspect, in a fifth possible implementation of the second aspect, the method further includes: adding a header field to the data transmission message, where the header field includes an indication information element, and the indication information element is used to indicate the priority of the data transmission.

According to a third aspect, the present invention provides a data transmission apparatus, where the apparatus includes: a processing module, configured to determine, based on a type of the terminal device and a type of data generated by the terminal device, a data transmission rule of the data generated by the terminal device; and a sending module, configured to send a data transmission message to the terminal device, where the data transmission message carries the data transmission rule, so that the terminal device sends, to the system platform based on the data transmission rule, the data corresponding to the data transmission rule.

With reference to the third aspect, in a first possible implementation of the third aspect, the processing module is specifically configured to: determine, based on the type of the terminal device and the type of the data of the terminal device, a priority of the data generated by the terminal device; and determine the data transmission rule based on the priority of the data.

With reference to the third aspect or the first possible implementation of the third aspect, in a second possible implementation of the third aspect, the data transmission rule includes a data transmission priority and a data transmission manner.

With reference to the second possible implementation of the third aspect, in a third possible implementation of the third aspect, when the priority of the data is less than a first predetermined threshold, the processing module is specifically configured to set the terminal device to upload the data to the system platform only when the system platform queries the data.

With reference to the second possible implementation of the third aspect or the third possible implementation of the third aspect, in a fourth possible implementation of the third aspect, the data transmission rule further includes an advance data reporting rule, where the advance data reporting rule is used for transmitting the data to the system platform once the terminal device detects that a floating change value of the data is greater than a second predetermined threshold.

With reference to any one of the third aspect to the fourth possible implementation of the third aspect, in a fifth possible implementation of the third aspect, the processing module is further configured to add a header field to the data transmission message, where the header field includes an indication information element, and the indication information element is used to indicate the priority of the data.

According to a fourth aspect, an embodiment of the present invention provides another data transmission apparatus, where the apparatus includes:

a processing module, configured to determine, based on a type of the terminal device and a type of data generated by the terminal device, a data transmission rule of data transmitted by the gateway; and a sending module, configured to send a data transmission message to the gateway, where the data transmission message carries a data transmission rule, so that the gateway obtains, from the terminal device based on the data transmission rule, data corresponding to the data transmission rule, and sends the data to the system platform.

With reference to the fourth aspect, in a first possible implementation of the fourth aspect, the processing module is specifically configured to: determine, based on the type of the terminal device and the type of the data of the terminal device, a priority of the data generated by the terminal device; and determine the data transmission rule based on the priority of the data.

With reference to the fourth aspect or the first possible implementation of the fourth aspect, in a second possible implementation of the fourth aspect, the data transmission rule includes a data transmission priority and a data transmission manner.

With reference to the second possible implementation of the fourth aspect, in a third possible implementation of the fourth aspect, when the priority of the data is less than a first predetermined threshold, the processing module is specifically configured to set the gateway to upload the data to the system platform only when the system platform queries the data.

With reference to the second possible implementation of the fourth aspect or the third possible implementation of the fourth aspect, in a fourth possible implementation of the fourth aspect, the data transmission rule further includes an advance data reporting rule, where the advance data reporting rule is used for transmitting the data to the system platform once the gateway detects that a floating change value of the data is greater than a second predetermined threshold.

With reference to any one of the fourth aspect to the fourth possible implementation of the fourth aspect, in a fifth possible implementation of the fourth aspect, the processing module is further configured to add a header field to the data transmission message, where the header field includes an indication information element, and the indication information element is used to indicate the priority of the data transmission.

According to a fifth aspect, an embodiment of the present invention further provides a data transmission system, and the system includes the apparatus and the terminal device according to any aspect of the third aspect.

According to a sixth aspect, an embodiment of the present invention further provides another data transmission system, and the system includes: the apparatus, the terminal device, and the gateway according to any aspect of the fourth aspect.

Based on the foregoing technical solutions, an embodiment of the present invention provides a data transmission method. The system platform first obtains a device type of a registered terminal device and a type of data of the terminal device, and determines a data transmission rule based on the terminal device type and the data type. The data transmission rule includes a data transmission priority, a data transmission manner, an advance reporting rule, and the like. Massive data can be effectively prevented from being transmitted to the system platform by configuring the data transmission rule, and data with a high priority can be preferentially processed, to improve system performance.

DESCRIPTION OF EMBODIMENTS

The technical solutions of the present invention are further described in detail with reference to accompanying drawings and embodiments as follows:

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
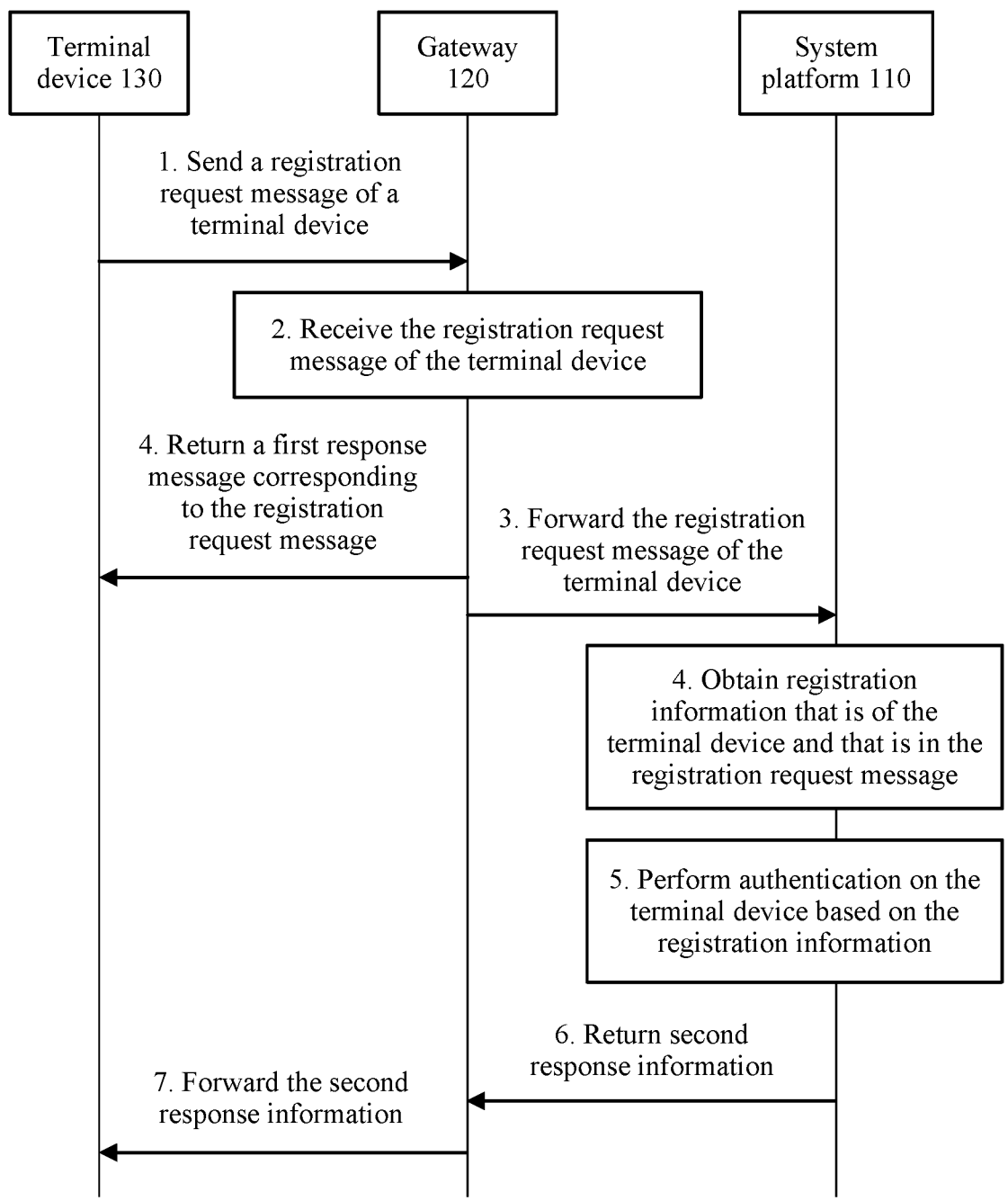
FIG. 1 is a signaling flowchart 100 in which a terminal device transmits terminal registration information to a system platform for registration by using a gateway according to an embodiment of the present invention.

FIG. 1 is a signaling flowchart in which a terminal device transmits terminal registration information to a system platform for registration by using a gateway. A specific registration process is as follows:

First, the terminal device sends a registration request message to the gateway. The registration request message carries registration information, and the registration information includes ID information of the terminal device, authentication information of the terminal device, a type of the terminal device, and a type of data of the terminal device. After receiving the registration request message of the terminal device, the gateway returns, to the terminal device, first response information corresponding to the registration request message, and forwards, to the system platform, the registration request message that carries the registration information. After receiving the registration request message, the system platform obtains the registration information from the registration request message, performs authentication on the terminal device based on the registration information, and after the authentication succeeds, returns second response information indicating authentication success to the gateway. The gateway forwards the second response information to the terminal device. Certainly, if the registration fails, the system platform returns third response information, and the gateway feeds back the third response information to the terminal device.

It should be understood that the process in which the terminal device transmits the registration request message to the gateway and then forwards the registration request message to the system platform by using the gateway, and the system platform performs registration on the terminal device based on the registration information in the registration request message needs to be performed only once, and is not performed during each time of data transmission based on the data transmission rule. The registration process is a necessary process that needs to be performed before the data transmission. Therefore, this embodiment first summarizes an execution process of registering the terminal device with the system platform.

It should be noted that a terminal may register with the system platform in two manners: In one manner, the terminal registers with the system platform by using a gateway (a specific process is described above); and in another manner, the terminal device directly registers with the system platform without using a node of a gateway. A specific execution process is similar to the registration process performed by using a gateway. An only difference therebetween is that no gateway is used as a medium in the execution process. Details are not described herein again.

The following describes a specific data transmission process in each of the two manners.

Figure 2:
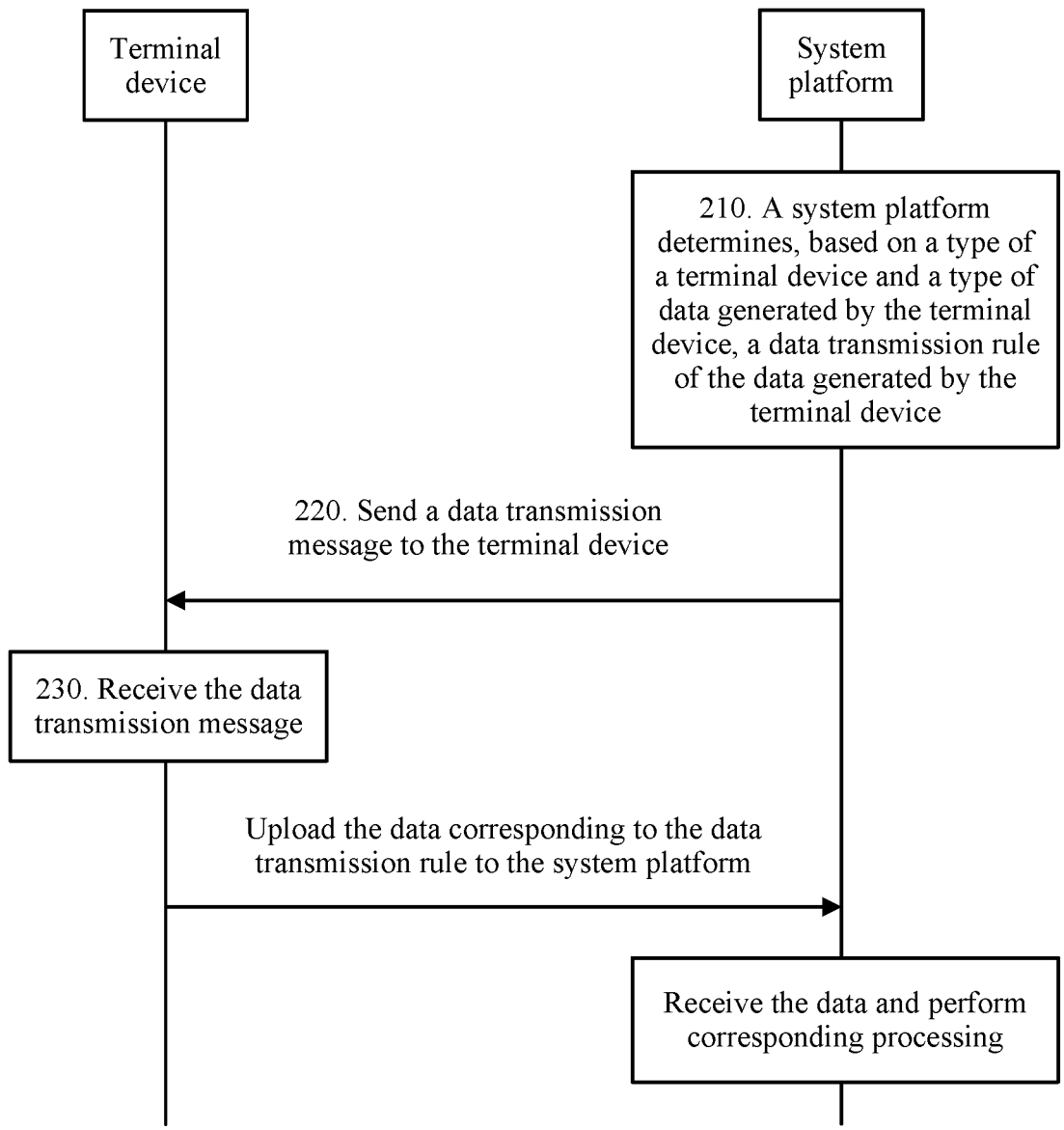
FIG. 2 is a signaling flowchart 200 of data transmission between devices in a data transmission system according to Embodiment 1 of the present invention.

FIG. 2 is a signaling flowchart 200 of data transmission between components in a data transmission system according to Embodiment 1 of the present invention. The system includes a system platform and a terminal device. A specific operating process is as follows:

Step 210: Determine, based on a type of the terminal device and a type of data generated by the terminal device, a data transmission rule of the data generated by the terminal device.

Specifically, registration information of the terminal device includes ID information of the terminal device, authentication information of the terminal device, a type of the terminal device, and the type of the data of the terminal device. Therefore, after obtaining the registration information of the terminal device, the system platform may determine the type of the terminal device and the type of the data of the terminal device.

A priority of the terminal device may be determined based on the type of the terminal device and the type of the data generated by the terminal device, and the data transmission rule may be determined based on the priority of the data. The data transmission rule may include a data transmission priority and a data transmission manner.

Device types may include a key monitoring device, a common monitoring device, a restricted monitoring device, and a non-monitoring device. Data types may include device management data, real-time data, log data, and the like. For example, a priority of log data of a key monitoring device is always lower than a priority of alarm data of a common monitoring device. Alternatively, a data priority may be specifically represented in a numeric form. For example, data priorities are set to levels 1 to 9. Levels of high-priority data are set to levels 7 to 9, levels of common-priority data are set to levels 4 to 6, and levels of low-priority data are set to levels 1 to 3. Representation forms of data priorities that are specifically determined based on device types and data types may be shown in Table 1.

|  | Terminal device type | | |
| --- | --- | --- | --- |
| Data type | Key monitoring device | Common monitoring device | Restricted/ non-monitoring device |
| Device management data | 9 | 8 | 7 |
| Real-time data | 6 | 5 | 4 |
| Log data | 3 | 2 | 1 |

In addition, when a data priority is lower than a first predetermined threshold (for example, the first predetermined threshold is 4), it is set that the terminal device does not actively transmit data to the system platform but sends the data to the system platform only when the system platform sends a query message to the terminal device.

After the data priority is set, the data transmission manner may include: For data at the levels 7 to 9, the terminal device periodically uploads the data to the system platform;

for data at the levels 4 to 6, the terminal device collectively packs the data and uploads the data to the system platform at a time specified by the system platform; and for data at the levels 1 to 3, the terminal device sends the data to the system platform only when the system platform sends a query message.

In the data transmission rule, data at different levels may be transmitted to the system in a fixed time period, avoiding a problem of system performance degradation caused because the system platform receives massive data in a same time period.

However, the data of the terminal device cannot always be stable, and may greatly float in a time period. In this case, the data transmission rule described above cannot be further applied, to be specific, it is not applicable to wait till a time period for transmitting the data to transmit the data to the system platform for processing. Instead, the data needs to be immediately transmitted to the system platform, so that the system platform immediately processes the data. For example, a temperature sensor detects that an indoor temperature suddenly changes from 20 degrees Celsius to 60 degrees Celsius. In this case, an indoor fire accident may occur, or a device may be faulty. The terminal device needs to immediately read data and send the data to the system platform, so that the system platform can perform corresponding processing. Therefore, in this embodiment of the present invention, the data transmission rule may further include an advance data reporting rule. The advance data reporting rule is used for transmitting the data to the system platform once the terminal device detects that a floating change value of the data is greater than a second predetermined threshold.

Step 220: The system platform sends a data transmission message to the terminal device.

Specifically, the data transmission message carries the data transmission rule, so that the terminal device sends, to the system platform based on the data transmission rule, the data corresponding to the data transmission rule.

Optionally, a new header field may be added to the data transmission message. The header field includes a first indication information element used to indicate the data transmission priority.

Alternatively, a second indication information element indicating the data priority may be stored in a header field of the data transmission message.

Step 230: The terminal device receives a data transmission message sent by the system platform, where the data transmission message carries the data transmission rule.

Step 240: The terminal device sends, to the system platform based on the data transmission rule, the data corresponding to the data transmission rule.

Specifically, data that the system platform needs to obtain and a specific data transmission manner (including periodically transmitted data, data transmitted in a fixed time period, data that is not actively transmitted, and the like) described in step 220 may be determined based on the data transmission rule.

The terminal device needs to transmit, to the system platform in a time specified by the system platform, the data that the system platform needs to obtain.

In the transmission process, a priority of data transmission depends on a priority of the data. For example, when high-priority data is transmitted, and a data priority of the high-priority data falls within levels 7 to 9, in the data transmission process, data whose data priority is the level 9 needs to be transmitted to the system platform first, then data whose priority is the level 8 is transmitted to the system platform, and data whose priority is the level 7 is transmitted to the system platform at last. Similarly, for data with other priorities, data with a low priority is transmitted later than data with a relatively high priority.

In a specific example, it is assumed that terminal devices include a boiler temperature sensor, a meter in a house of a common user, and a temperature sensor in the house of the user. The terminal device directly sends a registration request message of the terminal device to the system platform. When the system platform successfully authenticates the terminal device, the terminal device is registered with the system platform. The system platform determines a type of each terminal device based on registration information of each terminal device. In addition, a corresponding data transmission rule is formulated for each terminal device based on a type of each terminal device and a type of data generated by each terminal device. For example, the terminal device is a boiler temperature sensor. A boiler is an energy conversion device. Hot water or steam generated by the boiler can directly provide heat and energy for industrial manufacturing and people life, or may be converted into mechanical energy by using a steam power apparatus. The mechanical energy may be further converted into electrical power by using an electric generator. Once a temperature of the boiler reaches a specific high level, the boiler may explode, and a machine may be damaged, even worse, causing body injury to working personnel. Therefore, it is necessary to constantly monitor the temperature of the boiler. Therefore, the boiler temperature sensor is a key monitoring device, and temperature data detected by the boiler temperature sensor is important data. Therefore, it may be determined, based on the type of the terminal device and the type of the data, that the temperature data detected by the boiler temperature sensor is key monitoring data at the levels 7 to 9. Data detected by a meter used in a house of a common user may be periodically uploaded to the system platform, so that the system collects statistics for a quantity of electricity used by the user in a fixed time period, and notifies the user of an electricity bill in a timely manner. Therefore, data of this type may be classified as common monitoring data at the levels 4 to 6. An indoor temperature sensor of the user is configured to detect an indoor temperature. Generally, a variation amplitude of the indoor temperature is not large, so that temperature data does not need to be transmitted to the system platform in real time. The terminal device needs to upload the data to the system platform only when the system platform performs a query. Therefore, the data may be classified as low-priority data at the levels 1 to 3.

When transmitting the foregoing data, for example, at a same moment, the terminal device needs to transmit current temperature data of the boiler temperature sensor and total electricity quantity data of the meter within a month to the system platform. A priority of the temperature data of the boiler temperature sensor is higher than a priority of the electricity quantity data of the meter. Therefore, the temperature data of the boiler temperature sensor is preferentially transmitted, and then the electricity power data of the electricity meter is transmitted.

In another case, it can be learned from the foregoing description that the temperature data obtained by the indoor temperature sensor of the user is low-priority data, and generally, the terminal device does not actively transmit the temperature data to the system platform. However, once the indoor temperature sensor detects that the indoor temperature suddenly rises from 20° C. to 60° C., it indicates that a floating variation value of the indoor temperature exceeds a specific threshold (for example, 10° C.). If the temperature rises sharply, a fire accident may occur. Once the terminal device determines that the temperature sensor detects that the indoor temperature rises from 20° C. to 60° C., the terminal device immediately uploads the information to the system platform, so that the system platform processes the event in a timely manner.

According to the data transmission method provided in Embodiment 1 of the present invention, the system platform sets a data transmission rule based on a type of a registered terminal device and a type of data generated by the terminal device. The data transmission rule includes a data transmission priority, a data transmission manner, an advance reporting rule, and the like. Massive data can be effectively prevented from being transmitted to the system platform by configuring the data transmission rule, and data with a high priority can be preferentially processed, to improve system performance.

Figure 3:
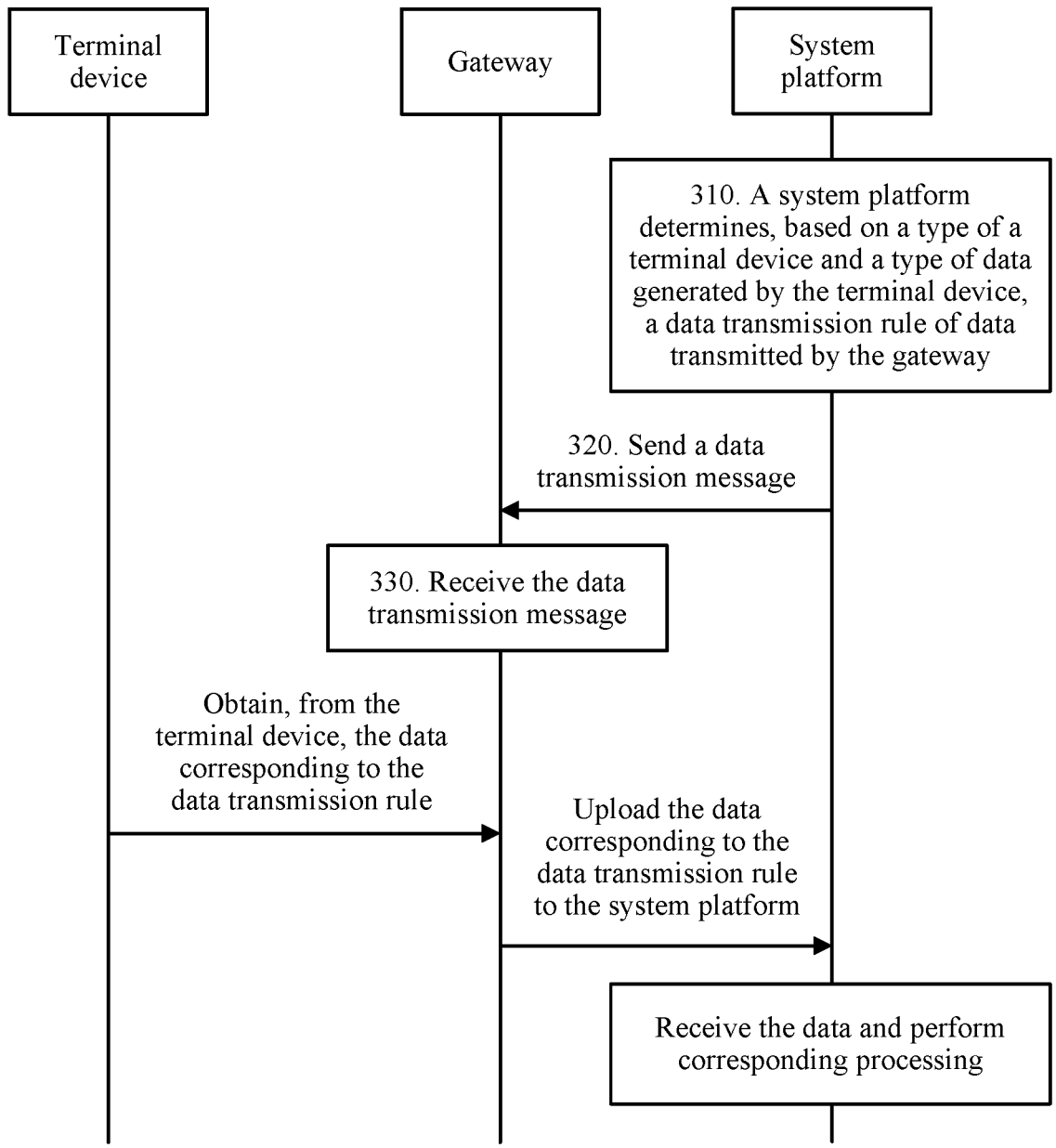
FIG. 3 is a signaling flowchart 300 of data transmission between devices in another data transmission system according to Embodiment 2 of the present invention.

In another case, the terminal device may further establish a communications connection to the system platform by using a gateway. A specific process in which interaction is established between the terminal device and the system platform by using the gateway is shown in FIG. 3. FIG. 3 is a signaling flowchart 300 of data transmission between components in another data transmission system according to Embodiment 2 of the present invention. The system includes a system platform, a gateway, and a terminal device. A specific operating process is as follows:

Step 310: The system platform determines, based on a type of the terminal device and a type of data generated by the terminal device, a data transmission rule of data transmitted by the gateway.

Specifically, registration information of the terminal device includes ID information of the terminal device, authentication information of the terminal device, a type of the terminal device, and the type of the data of the terminal device. Therefore, after obtaining the registration information of the terminal device, the system platform may determine the type of the terminal device and the type of the data of the terminal device.

A priority of the terminal device may be determined based on the type of the terminal device and the type of the data generated by the terminal device, to determine the data transmission rule based on the priority of the data. The data transmission rule may include a data transmission priority and a data transmission manner.

Device types may include a key monitoring device, a common monitoring device, a restricted monitoring device, and a non-monitoring device. Data types may include device management data, real-time data, log data, and the like. For example, a priority of log data of a key monitoring device is always lower than a priority of alarm data of a common monitoring device. Alternatively, a data priority may be specifically represented in a numeric form. For example, data priorities are set to levels 1 to 9. Levels of high-priority data are set to levels 7 to 9, levels of common-priority data are set to levels 4 to 6, and levels of low-priority data are set to levels 1 to 3. Representation forms of data priorities that are specifically determined based on device types and data types may be shown in Table 1.

|  | Terminal device type | | |
| --- | --- | --- | --- |
| Data type | Key monitoring device | Common monitoring device | Restricted/ non-monitoring device |
| Device management data | 9 | 8 | 7 |
| Real-time data | 6 | 5 | 4 |
| Log data | 3 | 2 | 1 |

In addition, when a data priority is lower than a first predetermined threshold (for example, the first predetermined threshold is 4), it is set that the gateway does not actively transmit data to the system platform but sends the data to the system platform only when the system platform sends a query message to the gateway.

After the data priority is set, the data transmission manner may include: For data at the levels 7 to 9, the gateway periodically uploads the data to the system platform;
  for data at the levels 4 to 6, the gateway collectively packs the data and uploads the data to the system platform at a time specified by the system platform; and
  for data at the levels 1 to 3, the gateway sends the data to the system platform only when the system platform sends a query message.

In the data transmission rule, different data may be transmitted to the system in a fixed time period based on priorities of the data, avoiding a problem of system performance degradation caused because the system platform receives massive data in a same time period.

However, the data of the terminal device cannot always be stable, and may greatly float in a time period. In this case, the data transmission rule described above cannot be further applied, to be specific, it is not applicable to wait till a time for transmitting the data to transmit the data to the system platform for processing. Instead, the data needs to be immediately transmitted to the system platform, so that the system platform immediately processes the data. For example, a temperature sensor detects that an indoor temperature suddenly changes from 20 degrees Celsius to 60 degrees Celsius. In this case, an indoor fire accident may occur, or a device may be faulty. The gateway needs to immediately read data and send the data to the system platform, so that the system platform can perform corresponding processing. Therefore, in this embodiment of the present invention, the data transmission rule may further include an advance data reporting rule. The advance data reporting rule is used for transmitting the data to the system platform once the gateway detects that a floating change value of the data is greater than a second predetermined threshold.

Step 320: The system platform sends a data transmission message to the gateway.

Specifically, the data transmission message carries the data transmission rule, so that the gateway obtains, from the terminal device based on the data transmission rule, the data corresponding to the data transmission rule, and sends the data to the system platform.

Optionally, a new header field may be added to the data transmission message. The header field includes a first indication information element used to indicate the data transmission priority.

Alternatively, a second indication information element indicating the data priority may be stored in a header field of the data transmission message.

Step 330: The gateway receives a data transmission message sent by the system platform, where the data transmission message carries the data transmission rule.

Step 340: Obtain, from the terminal device based on the data transmission rule, the data corresponding to the data transmission rule, and send the data to the system platform.

Specifically, data that the system platform needs to obtain and a specific data transmission manner described in step 310 may be determined based on the data transmission rule.

In a time specified by the system platform, the gateway needs to obtain, from the terminal device, current data that the system platform needs to obtain, and transmit the data to the system platform.

In the transmission process, a priority of data transmission depends on a priority of the data. For example, when high-priority data is transmitted, and a data priority of the high-priority data falls within levels 7 to 9, in the data transmission process, data whose data priority is the level 9 needs to be transmitted to the system platform first, then data whose priority is the level 8 is transmitted to the system platform, and data whose priority is the level 7 is transmitted to the system platform at last. Similarly, for data with other priorities, data with a low priority is transmitted later than data with a relatively high priority.

It should be noted that it can be learned from the foregoing description that data that is not actively uploaded by the gateway, for example, low-priority data, is sent by the gateway to the system platform when the system platform needs to perform a query. However, the gateway may further set a query parameter for reported data corresponding to the query. The query parameter may be a parameter set in terms of time and space. For example, in terms of time, the gateway stores only low-priority data obtained within three months. After another three months pass, new data obtained replaces the data obtained within the previous three months. Alternatively, in terms of space, the gateway sets fixed storage space for low-priority data. When the storage space is fully occupied, if new data needs to be stored, the gateway replaces previously stored data with the new data.

Correspondingly, the process in which the gateway reports data that the system platform needs to query may include two types of cases. When the system platform sends a query message to the gateway, the query message may carry a third indication information element, where the third indication information element is used to instruct the gateway to transmit a current message or a latest message of the terminal device.

When the third indication information element indicates the current message of the gateway, the gateway directly adds, to a response message replied to the system platform, data information that is of the terminal device and that is currently stored by the gateway.

When the third indication information element indicates the latest message of the device, the gateway needs to query latest data information of the terminal device, and then adds the latest data information of the terminal device to a response message replied to the system platform.

Optionally, when the gateway currently detects that a data floating value of a terminal device is greater than the second predetermined threshold, the data transmission rule described above cannot be further applied, to be specific, it is not applicable to wait till a time for transmitting data to transmit the data to the system platform for processing. Instead, the data needs to be immediately transmitted to the system platform based on the advance data reporting rule, so that the system platform immediately processes the data.

In a specific example, it is assumed that terminal devices include a boiler temperature sensor, a meter in a house of a common user, and a temperature sensor in the house of the user. The terminal device sends a registration request message of the terminal device to the system platform by using the gateway. When the system platform successfully authenticates the terminal device, the terminal device is registered with the system platform. The system platform determines a type of each terminal device based on registration information of each terminal device. In addition, a corresponding data transmission rule is formulated for each terminal device based on a type of each terminal device. For example, the terminal device is a boiler temperature sensor. A boiler is an energy conversion device. Hot water or steam generated by the boiler can directly provide heat and energy for industrial manufacturing and people life, or may be converted into mechanical energy by using a steam power apparatus. The mechanical energy may be further converted into electrical power by using an electric generator. Once a temperature of the boiler reaches a specific high level, the boiler may explode, and a machine may be damaged, even worse, causing body injury to working personnel. Therefore, it is necessary to constantly monitor the temperature of the boiler. Therefore, the boiler temperature sensor is a key monitoring device, and temperature data detected by the boiler temperature sensor is important data. Therefore, it may be determined, based on the type of the terminal device and the type of the data, that the temperature data detected by the boiler temperature sensor is key monitoring data at the levels 7 to 9. Data detected by a meter used in a house of a common user may be periodically uploaded to the system platform, so that the system collects statistics for a quantity of electricity used by the user in a fixed time period, and notifies the user of an electricity bill in a timely manner. Therefore, data of this type may be classified as common monitoring data at the levels 4 to 6. An indoor temperature sensor of the user is configured to detect an indoor temperature. Generally, a variation amplitude of the indoor temperature is not large, so that temperature data does not need to be transmitted to the system platform in real time. The gateway needs to upload the data to the system platform only when the system platform performs a query. Therefore, the data may be classified as low-priority data at the levels 1 to 3.

When transmitting the foregoing data, for example, at a same moment, the gateway needs to transmit current temperature data of the boiler temperature sensor and total electricity quantity data of the meter within a month to the system platform. A priority of the temperature data of the boiler temperature sensor is higher than a priority of the electricity quantity data of the meter. Therefore, the temperature data of the boiler temperature sensor is preferentially transmitted, and then the electricity power data of the electricity meter is transmitted.

In another case, it can be learned from the foregoing description that the temperature data obtained by the indoor temperature sensor of the user is low-priority data, and generally, the gateway does not actively transmit the temperature data to the system platform. However, once the indoor temperature sensor detects that the indoor temperature suddenly rises from 20° C. to 60° C., it indicates that a floating variation value of the indoor temperature exceeds a specific threshold (for example, 10° C.). If the temperature rises sharply, a fire accident may occur. Once the gateway determines that the temperature sensor detects that the indoor temperature rises from 20° C. to 60° C., the gateway immediately uploads the information to the system platform, so that the system platform processes the event in a timely manner.

According to the data transmission method provided in Embodiment 2 of the present invention, the system platform sets a data transmission rule based on a type of a registered terminal device and a type of data generated by the terminal device. The data transmission rule includes a data transmission priority, a data transmission manner, an advance reporting rule, and the like. Massive data can be effectively prevented from being transmitted to the system platform by configuring the data transmission rule, and data with a high priority can be preferentially processed, to improve system performance.

Figure 4:
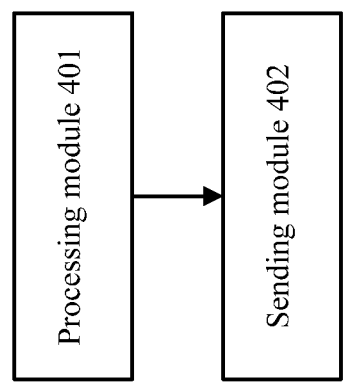
FIG. 4 is a schematic structural diagram 400 of a data transmission apparatus according to Embodiment 3 of the present invention.

Embodiment 3 of the present invention provides a data transmission apparatus corresponding to the data transmission method provided in Embodiment 1 of the present invention. The data transmission apparatus mainly corresponds to a system platform in a data transmission system. Details are shown in FIG. 4. FIG. 4 is a schematic structural diagram 400 of a data transmission apparatus according to an embodiment of the present invention. The apparatus includes a processing module 401 and a sending module 402.

The processing module 401 is configured to determine, based on a type of the terminal device and a type of data generated by the terminal device, a data transmission rule of the data generated by the terminal device.

Specifically, the processing module 401 determines, based on the type of the terminal device and the type of the data of the terminal device, a priority of the data generated by the terminal device, and determines the data transmission rule based on the priority of the data. The data transmission rule may include a data transmission priority and a data transmission manner.

Optionally, when the priority of the data is less than a first predetermined threshold, the processing module 401 is specifically configured to set the terminal device to upload the data to the system platform only when the system platform queries the data.

In the data transmission rule, data at different levels may be transmitted to the system in a fixed time period, avoiding a problem of system performance degradation caused because the system platform receives massive data in a same time period.

However, the data of the terminal device cannot always be stable, and may greatly float in a time period. In this case, the data transmission rule described above cannot be further applied, to be specific, it is not applicable to wait till a time period for transmitting the data to transmit the data to the system platform for processing. Instead, the data needs to be immediately transmitted to the system platform, so that the system platform immediately processes the data. For example, a temperature sensor detects that an indoor temperature suddenly changes from 20 degrees Celsius to 60 degrees Celsius. In this case, an indoor fire accident may occur, or a device may be faulty. The terminal device needs to immediately read data and send the data to the system platform, so that the processing module 401 can perform corresponding processing. Therefore, in this embodiment of the present invention, the data transmission rule may further include an advance data reporting rule. The advance data reporting rule is used for transmitting the data to the system platform once the terminal device detects that a floating change value of the data is greater than a second predetermined threshold.

In addition, the processing module 401 is further configured to add a header field to a data transmission message, where the header field includes an indication information element, and the indication information element is used to indicate the priority of the data.

The sending module 402 is configured to send a data transmission message to the terminal device, where the data transmission message carries the data transmission rule, so that the terminal device sends, to the system platform based on the data transmission rule, the data corresponding to the data transmission rule.

When run, the apparatus provided in Embodiment 3 of the present invention performs the method steps performed by the system platform provided in Embodiment 1 of the present invention. For operating details, refer to the method provided in Embodiment 1 of the present invention.

According to the data transmission apparatus provided in this embodiment, the processing module first obtains a device type of a registered terminal device and a type of data of the terminal device, and determines a data transmission rule based on the terminal device type and the data type. The data transmission rule includes a data transmission priority, a data transmission manner, an advance reporting rule, and the like. Massive data can be effectively prevented from being transmitted to the system platform by configuring the data transmission rule, and data with a high priority can be preferentially processed, to improve system performance.

Figure 5:
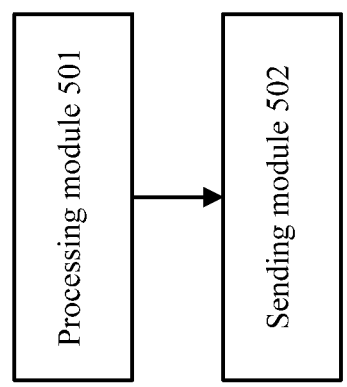
FIG. 5 is a schematic structural diagram 500 of another data transmission apparatus according to Embodiment 4 of the present invention.

Embodiment 4 of the present invention provides another data transmission apparatus corresponding to the data transmission method provided in Embodiment 2 of the present invention. The data transmission apparatus corresponds to a system platform in another data transmission system. Details are shown in FIG. 5. FIG. 5 is a schematic structural diagram 500 of a data transmission apparatus according to an embodiment of the present invention. The apparatus includes a processing module 501 and a sending module 502.

The processing module 501 is configured to determine, based on a type of the terminal device and a type of data generated by the terminal device, a data transmission rule of data transmitted by a gateway.

Specifically, the processing module 501 determines, based on the type of the terminal device and the type of the data of the terminal device, a priority of the data generated by the terminal device, and determines the data transmission rule based on the priority of the data. The data transmission rule includes a data transmission priority and a data transmission manner.

Optionally, when the priority of the data is less than a first predetermined threshold, the processing module is specifically configured to set the gateway to upload the data to the system platform only when the system platform queries the data.

In the data transmission rule, different data may be transmitted to the system in a fixed time period based on priorities of the data, avoiding a problem of system performance degradation caused because the system platform receives massive data in a same time period.

However, the data of the terminal device cannot always be stable, and may greatly float in a time period. In this case, the data transmission rule described above cannot be further applied, to be specific, it is not applicable to wait till a time for transmitting the data to transmit the data to the system platform for processing. Instead, the data needs to be immediately transmitted to the system platform, so that the system platform immediately processes the data. For example, a temperature sensor detects that an indoor temperature suddenly changes from 20 degrees Celsius to 60 degrees Celsius. In this case, an indoor fire accident may occur, or a device may be faulty. The gateway needs to immediately read data and send the data to the system platform, so that the system platform can perform corresponding processing. Therefore, in this embodiment of the present invention, the data transmission rule may further include an advance data reporting rule. The advance data reporting rule is used for transmitting the data to the system platform once the gateway detects that a floating change value of the data is greater than a second predetermined threshold.

In addition, the data processing module is further configured to add a header field to a data transmission message, where the header field includes an indication information element, and the indication information element is used to indicate the priority of the data transmission.

When run, the apparatus provided in Embodiment 4 of the present invention performs the method steps performed by the system platform provided in Embodiment 2 of the present invention. For operating details, refer to the method provided in Embodiment 2 of the present invention.

According to the data transmission apparatus provided in Embodiment 4, the processing module first obtains a device type of a registered terminal device and a type of data of the terminal device, and determines a data transmission rule based on the terminal device type and the data type. The data transmission rule includes a data transmission priority, a data transmission manner, an advance reporting rule, and the like. Massive data can be effectively prevented from being transmitted to the system platform by configuring the data transmission rule, and data with a high priority can be preferentially processed, to improve system performance.

Embodiment 5 of the present invention further provides a data transmission system, and the system includes the data transmission apparatus in Embodiment 3 and a terminal device. Method steps performed by components in the system are described in detail in Embodiment 1, and no further description is provided herein.

Similarly, Embodiment 6 of the present invention further provides another data transmission system, and the system includes the data transmission apparatus in Embodiment 4, a terminal device, and a gateway. Method steps performed by components in the system are described in detail in Embodiment 2, and no further description is provided herein.

A person skilled in the art may be further aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processing module, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the embodiments of the present invention shall fall within the protection scope of the present invention.

What is claimed is:

1. A method of data transmission performed by a system platform, the method comprising:
   determining, based on a type of a terminal device and a type of data generated by the terminal device, a data transmission rule of the data generated by the terminal device, wherein the data transmission rule includes a data transmission manner and an advance data reporting rule, wherein the data transmission manner is determined based on a priority of the data generated by the terminal device and a first predetermined threshold, wherein the advance data reporting rule is a rule for transmitting the data generated by the terminal device to the system platform once the terminal device or the gateway detects that a floating change value of the data generated by the terminal device is greater than a second predetermined threshold, and wherein setting the data transmission manner comprises:
      in response to determining that the priority of the data generated by the terminal device is equal to or greater than the first predetermined threshold, setting the terminal device or a gateway to automatically upload the data generated by the terminal device to the system platform without requiring the system platform to submit a system platform query; and
      in response to determining that the priority of the data generated by the terminal device is less than the first predetermined threshold, setting the terminal device or the gateway to upload the data generated by the terminal device to the system platform only in response to when the system platform queries the terminal device for data; and
   sending a data transmission message to the terminal device or the gateway, wherein the gateway transmits data generated by the terminal device to the system platform, and the data transmission message carries the data transmission rule, so that the terminal device or the gateway sends to the system platform, based on the data transmission rule, the data generated by the terminal device corresponding to the data transmission rule.

2. The method according to claim 1, wherein determining, based on the type of the terminal device and the type of the data generated by the terminal device, the data transmission rule of the data generated by the terminal device comprises:
  determining, based on the type of the terminal device and the type of the data generated by the terminal device, the priority of the data generated by the terminal device; and
  determining the data transmission rule based on the priority of the data generated by the terminal device.

3. The method according to claim 1, wherein the data transmission rule comprises a data transmission priority.

4. The method according to claim 1, wherein the method further comprises:
  adding a header field to the data transmission message, wherein the header field comprises an indication information element, and the indication information element is used to indicate the priority of the data.

5. The method according to claim 1, wherein automatically uploading the data generated by the terminal device to the system platform comprises:
  transmitting, by the terminal device, the data generated by the terminal device periodically to the system platform without requiring the system platform to submit the system platform query; or
  transmitting, by the terminal device, the data generated by the terminal device to the system platform at a time specified by the system platform without requiring the system platform to submit the system platform query.

6. A data transmission apparatus, comprising:
  a memory to store instructions; and
  a processor to execute the instructions to configure the data transmission apparatus to:
  determine, based on a type of a terminal device and a type of data generated by the terminal device, a data transmission rule of the data generated by the terminal device, wherein the data transmission rule includes a data transmission manner and an advance data reporting rule, wherein the data transmission manner is determined based on a priority of the data generated by the terminal device and a first predetermined threshold, wherein the advance data reporting rule is a rule for transmitting the data generated by the terminal device to a system platform once the terminal device or the gateway detects that a floating change value of the data generated by the terminal device is greater than a second predetermined threshold, and wherein setting the data transmission manner comprises:
    in response to determining that the priority of the data generated by the terminal device is equal to or greater than the first predetermined threshold, set the terminal device or a gateway to automatically upload the data generated by the terminal device to the system platform without requiring the system platform to submit the system platform query; and
    in response to determining that the priority of the data generated by the terminal device is less than the first predetermined threshold, set the terminal device or the gateway to upload the data generated by the terminal device to the system platform only in response to when the system platform queries the terminal device for data; and
  send a data transmission message to the terminal device or the gateway, wherein the gateway transmits data generated by the terminal device to the system platform, and the data transmission message carries the data transmission rule, so that the terminal device or the gateway sends, to the system platform based on the data transmission rule, the data generated by the terminal device corresponding to the data transmission rule.

7. The apparatus according to claim 6, wherein the processor further executes the instructions to configure the data transmission apparatus to:
  determine, based on the type of the terminal device and the type of the data generated by the terminal device, the priority of the data generated by the terminal device; and
  determine the data transmission rule based on the priority of the data generated by the terminal device.

8. The apparatus according to claim 6, wherein the data transmission rule comprises a data transmission priority.

9. The apparatus according to claim 6, wherein the processor further executes the instructions to configure the data transmission apparatus to add a header field to the data transmission message, wherein the header field comprises an indication information element, and the indication information element is used to indicate the priority of the data.

10. An apparatus, comprising:
  a processor to determine, based on a type of a terminal device and a type of data generated by the terminal device, a data transmission rule of the data generated by the terminal device, wherein the data transmission rule includes a data transmission manner and an advance data reporting rule, wherein the data transmission manner is determined based on a priority of the data generated by the terminal device and a first predetermined threshold, wherein the advance data reporting rule is a rule for transmitting the data generated by the terminal device to a system platform once the terminal device or the gateway detects that a floating change value of the data generated by the terminal device is greater than a second predetermined threshold, and wherein setting the data transmission manner comprises:
    in response to determining that the priority of the data generated by the terminal device is equal to or greater than the first predetermined threshold, setting the terminal device or a gateway to automatically upload the data generated by the terminal device to the system platform without requiring the system platform to submit the system platform query; and
    in response to determining that the priority of the data generated by the terminal device is less than the first predetermined threshold, setting the terminal device or the gateway to upload the data generated by the terminal device to the system platform only in response to when the system platform queries the terminal device for data; and
  a transmitter to send a data transmission message to the terminal device or the gateway, wherein the gateway transmits the data generated by the terminal device to the system platform, and the data transmission message carries the data transmission rule, so that the terminal device or the gateway sends, to the system platform based on the data transmission rule, the data generated by the terminal device corresponding to the data transmission rule.

11. The apparatus according to claim 10, wherein the processor is further configured to:
  determine, based on the type of the terminal device and the type of the data generated by the terminal device, the priority of the data generated by the terminal device; and determine the data transmission rule based on the priority of the data generated by the terminal device.

12. The apparatus according to claim 10, wherein the data transmission rule comprises a data transmission priority.

13. The apparatus according to claim 10, wherein the processor is further configured to add a header field to the data transmission message, wherein the header field comprises an indication information element, and the indication information element is used to indicate the priority of the data.

* * * * *

UNITED STATES PATENT AND TRADEMARK OFFICE
CERTIFICATE OF CORRECTION

PATENT NO. : 10,945,143 B2  
APPLICATION NO. : 16/188824  
DATED : March 9, 2021  
INVENTOR(S) : Jing Li and Yang Xiao Page 1 of 1

It is certified that error appears in the above-identified patent and that said Letters Patent is hereby corrected as shown below:

On the Title Page

In Column 2, Line 1, delete "Andrea Tacdiran" and insert -- Andre Tacdiran --, therefor.

In the Specification

In Column 1, Line 10, delete "2016," and insert -- 2016. --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*